US012491269B2

(12) United States Patent
Korenko et al.

(10) Patent No.: US 12,491,269 B2
(45) Date of Patent: *Dec. 9, 2025

(54) RADIOACTIVE YTTRIUM PHOSPHATE SUSPENSION AND METHOD OF PREPARING THE SAME

(71) Applicant: Vivos, Inc., Kennewick, WA (US)

(72) Inventors: Michael Korenko, Pasco, WA (US); David Swanberg, Kennewick, WA (US)

(73) Assignee: VIVOS, INC., Richland, WA (US)

( * ) Notice: Subject to any disclaimer, the term of this patent is extended or adjusted under 35 U.S.C. 154(b) by 832 days.

This patent is subject to a terminal disclaimer.

(21) Appl. No.: 17/740,549

(22) Filed: May 10, 2022

(65) Prior Publication Data

US 2022/0313844 A1    Oct. 6, 2022

Related U.S. Application Data

(63) Continuation-in-part of application No. 16/459,466, filed on Jul. 1, 2019, now Pat. No. 11,478,557.

(51) Int. Cl.
*A61K 51/02* (2006.01)
*A61K 51/12* (2006.01)

(52) U.S. Cl.
CPC .......... *A61K 51/02* (2013.01); *A61K 51/1217* (2013.01); *A61K 51/1241* (2013.01)

(58) Field of Classification Search
CPC .......... A61L 27/52; A61L 27/16; A61L 27/18; A61L 27/26; A61L 27/3804; A61L 27/3834; A61L 27/54; A61L 2420/02
See application file for complete search history.

(56) References Cited

U.S. PATENT DOCUMENTS

| | | |
|---|---|---|
| 6,296,831 B1 | 10/2001 | Weller et al. |
| 6,841,617 B2 | 1/2005 | Jeong et al. |
| 7,087,244 B2 | 8/2006 | Jeong et al. |
| 2003/0144570 A1 | 7/2003 | Hunter |
| 2004/0228794 A1 | 11/2004 | Weller et al. |
| 2021/0060183 A1 | 3/2021 | Delaney, Jr. |

OTHER PUBLICATIONS

Agrawal, CM, Athanasiou, KA; Technique to Control pH in Vicinity of Biodegrading PLA-PGA Implants, J. Biomed. Mater. Res., vol. 38(2), 104-114, 1997.
Baumann, A., Tureck, E., Prabhu, S., Dickmann, L., Sims, J., Pharmacokinetics, metabolism and distribution of PEGs and PEGylated proteins: quo vadis?, Drug Discov. Today, vol. 19, 1623-1631, 2014.
Baumann, A., Piel, I., Hucke, F., Sandmann, S., Hetzel, T., Schwartz, T., Pharmacokinetics, excretion, distribution and metabolism of 60-kDa polyethylene glycol used in BAY 94-9027 in rats and its value for human prediction, Europ. J. of Pharm. Sci., vol. 130, 11-20, 2019.
Erbetta, CDC, Alves, RJ., Resende, JM., Freitas RFS., Sousa, RG., Synthesis and Characterization of Poly (D,L-lactide-co-glycolide) Copolymer. Journal of Biomaterials and Nanobiotechnology, vol. 3, 208-225, 2012.
Garcia-Estrada, P., Barcia-Bon., MA., Lopez-Naranjoj, EJ., Basaldua-Perez, DN., Santos, A., Navarro-Partida, J., Polymeric Implants for the Treatment of Intraocular Eye Diseases: Trends in Biodegradable and Non-Biodegradable Materials, Pharmaceutics, vol. 13, 701, 2021.
Gervais, KJ., Evaluation of a biodegradable thermogel polymer for intraocular delivery of cyclosporine A to prevent posterior capsule opacification, PhD Thesis, The Ohio State University, 2017.
Ivens, IA., Achanzar, W., Baumann, A., Brandli-Baiocco, A., Cavagnaro, J., Dempster, M., Depelchin, BO., Rovira. AR., Dill-Morton, OL., Lane, JH., Reipert BM., Salcedo, T., Schweighardt, B., Tsuruda, LS., Turecek, PL., Sims, J., PEGylated bio-pharmaceuticals: current experience and considerations for nonclinical development. Toxicol. Pathol. vol. 43, 959-983, 2015.
Jain, RA., The Manufacturing Techniques of Various Drug Loaded Biodegradable Poly(lactideo-co-glicolideo)(PLGA) Devices, Biomaterials, vol. 21, 2475-2490, 2000.
Lang, RC., Li, X., Shi, Y., Want, A., Sun, L., Li, WH., Li, YX., Effect of Water on Exenatide Acylation in Poly (lactide-co-glycolide) Microspheres, International Journal of Pharmaceutics, vol. 454, 344-353, 2013.
Laycock, B., Nikolic, M., Colwell, JM., Gauthier, E., Halley, P., Bottle, S., George G., Lifetime Prediction of Biodegradable Polymers, Prog. Polym. Sci, vol. 71, 144-189, 2017.
Lee, SS., Hughes, P., Ross, AD., Robinson, MR., Biodegradable implants for sustained drug release in the eye. Pharm. Res., vol. 27, 2043-2053, 2010.
Ma, H., Chaoliang, H., Cheng, Y., Li, D., Gong, Y., Keu, J., Tian, H., Chen, X., PLK1shRNA and doxorubicin co-loaded thermosensitive PLGA-PEG-PLGA hydrogels for osteosarcoma treatment, Biomaterials, vol. 35, 8723-8734, 2014.
Manickavasagam; E., Oyewumi, MO., Critical assessment of implantable drug delivery devices in glaucoma management. J. Drug Deliv., vol. 2013, 1-12, 2013.
Metha, S., Shastri, V., Muthurajan, H., Recent Advancement in PLGA Nano Polymer Synthesis and its Applications, J of Nanomedicine Research, vol. 4, Issue 1, Jul. 2016.
Pappalardo, DT., Mathisen, T., Finne-Wistrand, A., Biocompatibility of Resorbable Polymers: A Historical Perspective and Framework for the Future, Biomacromolecules, vol. 20, 1465-1477, 2019.
Peng, Y., Ang., M., Foo, S., Lee, WS., Ma, Z., Venkatraman, SS., Wong, TT., Biocompatibility and biodegradation studies of subconjunctival implants in rabbit eyes. PLoS ONE, vol. 6, e22057, 2011.

(Continued)

*Primary Examiner* — Robert S Cabral
(74) *Attorney, Agent, or Firm* — Indiano/Brannon et al

(57) ABSTRACT

A radioactive yttrium phosphate suspension, including a phosphate buffered saline solution and a plurality of radioactive yttrium phosphate particles suspended in the phosphate buffered saline solution. The plurality of radioactive yttrium phosphate particles are between 0.1 um to 2 um in diameter. The plurality of radioactive yttrium phosphate particles are generally spherical. The $YPO_4$ particle concentration is in the range of 40 mg/ml to 125 mg/ml.

18 Claims, 1 Drawing Sheet

(56) References Cited

OTHER PUBLICATIONS

Perinelli, DR., Cespi, M., Bonacucina, G., Palmieri, GF, PEGylated polylactide (PLA) and poly (lactic-co-glycolic acid) (PLGA) copolymers for the design of drug delivery systems, Journal of Pharmaceutical Investigation, 49:443-458, 2019.

Shellekens, H., Hennink, WE., Brinks, V., The immunogenicity of polyethylene glyol: facts and fiction, Pharm. Res., vol. 30, 1729-1734, 2013.

Souza, MCM., Fialho, SL., Souza, PAF, Fulgencio, GO, Da Silve, GR, Silva-Cunha, A., Tacrolimus-loaded PLGA implants: In vivo release and ocular toxicity. Curr. Eye Res. vol. 39, 99-102, 2014.

Stevanovic, M., Maksin, T., Petkovic, J., Filipic, M., Uskokovic, D., An Innovative, Quick and Convenient Labeling Method for the Investigation of Pharmacological Behavior and the Metabolism of Poly(DL-lactide-coglycolide) Nanospheres, Nanotechnology, vol. 20, 1-12, 2009a.

Stevanovic, M., Skokovic, D., Poly(lactide-co-glycolide)-Based micro and Nanoparticles for the Controlled Drug Delivery of Vitamins. Current Nanoscience, vol. 5, 1-14. 2009b.

Summer, KH, Klein, D., Grein, H., Toxological Evaluation of the Incorporation of Polymers and Copolymers Based on L- and D-Lactide and Glycolide Internal Report; Boehringer Ingelheim KG, 1987. IN: Pappalardo, D., T. Mathisen, and A Finne-Wistrand, Biocompatibility of Resorbable Polymers: A Historical Perspective and Framework for the Future, Biomacromolecules, vol. 20, 1465-1477, 2019.

Tarasevich, B, Gutowska, A., Li, XS, Jeong, B-M, The effect of polymer composition on the gelation behavior of PLGA-g-PEG biodegradable thermoreversible gels, J of Biomedical Materials Research Part A, 89(1):248-54, 2009.

Wang, P., Chu, W., Zhuo, X., Zhang, Y., Gou, J., Ren, T., He, H., Yin, T., Tang, X., Modified PLGA-PEG-PLGA thermosensitive hydrogels with suitable thermosensitivity and properties for use in a drug deliver system, J. Materials Chemistry B, Issue 8, 2017.

Webster, R., Didier, E., Harris, P., Siegel, N., Stadler, J., Tilbury, L., Smith, D., PEGylated proteins: evaluation of their safety in the absence of definitive metabolism studies. Drug Metab. Dispos. vol. 35, 9-16. 2007.

Yamaoka, T., Tabata, Y., Ikada, Y., Distribution and tissue uptake of poly(ethylene glycol) with differenct molecular weights after intravenous administration to mice, J. Pharm. Sci. vol. 83, 601-606, 1994.

Yasukawa, T.; Kimura, H.; Tabata, Y.; Ogura, Y., Biodegradable scleral plugs for vitreoretinal drug delivery. Adv. Drug Deliv. Rev., vol. 52, 25-36, 2001.

RADIOACTIVE YTTRIUM PHOSPHATE SUSPENSION AND METHOD OF PREPARING THE SAME

CROSS-REFERENCE TO RELATED APPLICATIONS

This patent application is a continuation-in-part of co-pending U.S. patent application Ser. No. 16/459,466, filed on Jul. 1, 2019.

TECHNICAL FIELD

The present novel technology relates generally to the field of radio-medicine and, more particularly, to a radioactive yttrium phosphate suspension and method of preparing the same.

BACKGROUND OF THE INVENTION

One common approach to the treatment of patients with certain kinds of cancer, such as liver cancer, is to introduce radioactive particles into the patient's circulatory system, wherein the radioactive particles are targeted to the site of the cancer. Specifically, a measured amount of radioactive isotopes are injected into the patient such that they accumulate at the site of the cancer. The lodged particles thus generate a predetermined field of radiation within or proximate to the location of a cancerous tumor. The particular radioactive isotope is typically selected according to the type of radiation emitted and its half-life, such that the radiation has enough range to be destructive to the tumor and proximal tumor margins but does only minimal damage to adjacent healthy tissues and organs and also such that the emission of radiation lasts for only a short, predetermined duration.

One commonly-used radioisotope is yttrium, usually in oxide form, since radioactive yttrium emits nearly 100 percent beta radiation. The yttrium oxide was initially suspended in a viscous liquid medium and introduced via injection. However, yttria's high density (5.01 gm/cm$^3$) and its inherently irregular particle shape resulted in: a) difficulties in maintaining a homogeneous suspension (and thus not treating the patient with a known and controlled radiation dosage); b) difficulties in concentrating all of the radioisotope at the tumor site (as the heavy yttrium oxide particles tend to drop out of suspension too soon and adhere to the interior of blood vessels; and c) the sharp corners and edges of yttrium oxide particles irritate surrounding tissue in localized areas, as well as interfere with the uniform distribution of the radioactive particles in the tumor to be treated.

Thus, there remains a need for a radio-medical cancer treatment that is useful in the treatment of cancer or tumor bearing tissue, but which will not release radioactive material to remote parts of the body of the patient after administration, will remain in suspension, will have a uniform and controllable particle size distribution suitable for perfusion within the tumor tissue. The present novel technology addresses these needs.

BRIEF DESCRIPTION OF THE FIGURES

The foregoing and other features and advantages of the present invention will become more readily appreciated as the same become better understood by reference to the following detailed description of the preferred embodiment of the invention when taken in conjunction with the accompanying drawings, wherein.

Figure 1:
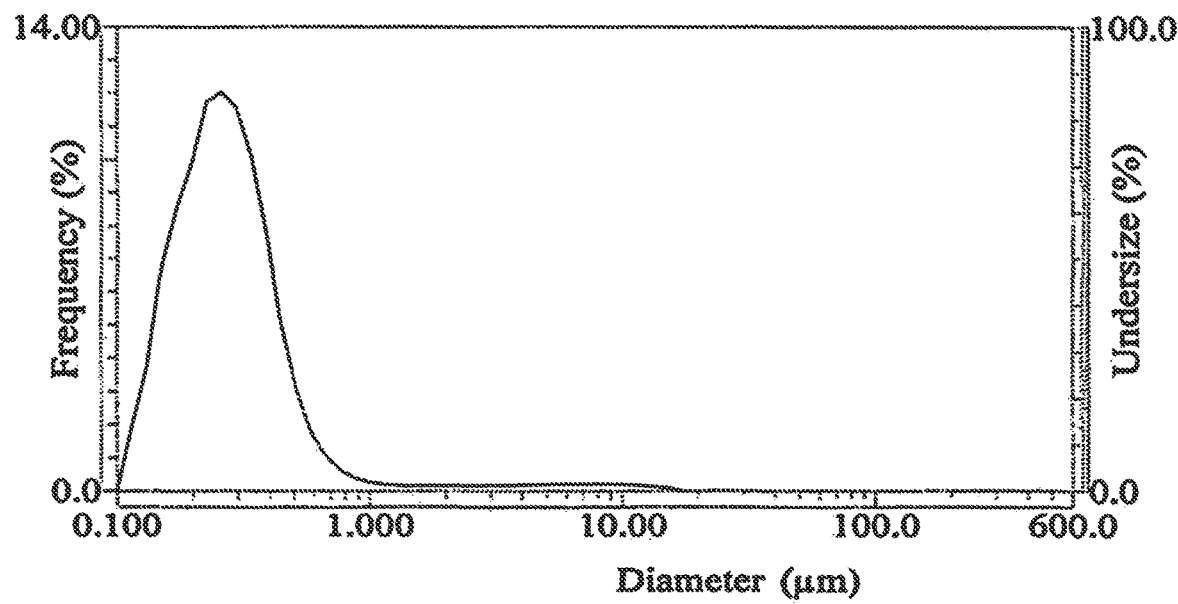
FIG. 1 illustrates particle size determined through the claimed process with pH of 7.35 yielding particle median size of 0.2450 um.
Figure 2:
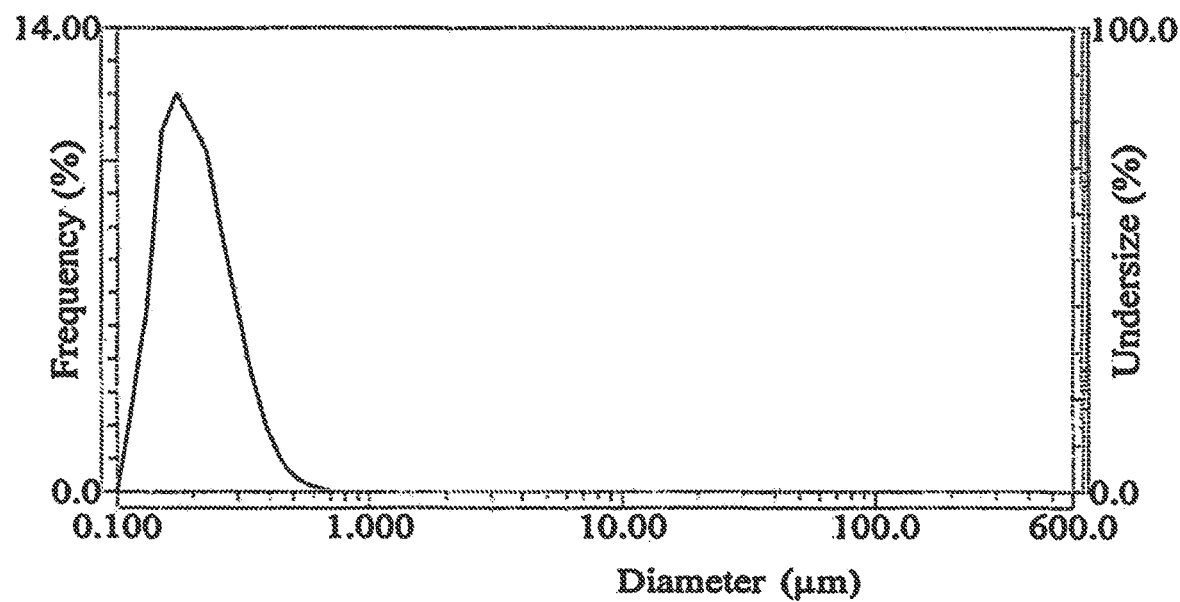
FIG. 2 illustrates a yttrium salt suspension having a pH 7.4 and median particle size of 0.1844 um, providing effectiveness for interstitial, extracellular space applications.

The foregoing descriptions of specific embodiments of the present invention have been presented for purposes of illustration and description. They are not intended to be exhaustive or to limit the present invention to the precise forms disclosed, and obviously many modifications and variations are possible in light of the above description and figures. The exemplary embodiment was chosen and described in order to best explain the principles of the present invention and its practical application for purposes of enabling others who are skilled in the art and making of the product to best utilize the present invention and various embodiments with various modifications as are suited to the particular use contemplated.

DETAILED DESCRIPTION OF THE INVENTION

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

In one embodiment, the present novel technology relates to a method of preparing a radioactive yttrium particle suspension. Yttrium salts such as yttrium chloride, yttrium nitrate, yttrium sulfate, yttrium bromide and combinations thereof are irradiated with neutron radiation to activate the yttrium (convert stable $^{89}$Y to radioactive $^{90}$Y). This may be done either before or after they are put into a stable suspension as follows.

The yttrium salts are put into solution and subsequently combined with a solution of soluble phosphates salt(s), such as sodium phosphate, lithium phosphate, potassium phosphate, and combinations thereof, and having a stoichiometric excess of phosphate. The resultant admixture is maintained at a pH in the range of 1.5 to 8. The solutions are agitated, typically with continuous stirring and also rapidly heated in a closed vessel to about 150 degrees Celsius and held for from about one to about ten hours to yield a greater than about 99.99% conversion of soluble yttrium to insoluble YPO$_4$ as well as to achieve a desired particle size distribution, typically less than 2 microns in diameter, more typically in the range of 0.03 um to 10 um, still more typically in the range of 0.05 um to 3 um, and yet more typically in the range of 0.1 um to 2 um with a median particle size of about 0.2 um. Through careful control of mixing time, temperature, and concentration of the reactants, a specific, desired particle size distribution and/or particle shape distribution of YPO$_4$ particles suspended may be achieved. Likewise, once the YPO$_4$ particles are formed, the solution may be buffered with saline to achieve neutral pH suitable for direct injection into human or animal tissue.

Typically, the radioactive particle suspension has a mean particle size of less than 2 um. The radioactive particle suspension is typically characterized by at least 90 percent of the total particle volume having generally spherical particles in the range of 0.1 um to 2 um. Typically, the starting concentration of soluble yttrium in the combined solution is in the range of 0.05 to 1.0 mole/liter, more typically in the range of 0.05 to 0.3 mole/liter, and still more typically in the range of 0.08 to 0.3 mole/liter and the stoichiometric excess of phosphate ranges from 10% to 100%. More typically, the starting concentration of soluble yttrium in the combined solution is 0.08 moles/liter and the stoichiometric excess of phosphate is in the range of 5% to 100%, more typically about 10%, and still more typically about 25%.

In other embodiments, the radioactive metal cation is selected from members of the Lanthanide series, such as Ce, Sm, Ho, Yb, Lu, and the like, and combinations thereof. In still other embodiments, the radioactive cation is selected from members of the metals and transition metals, such as Ga, In, Sn, Cu, Y, Sc, and the like and combinations thereof to yield insoluble or sparingly soluble transition metal phosphate(s). In yet other embodiments, the radioactive cation is selected from members of the alkali metals/alkali earth metals, such as Cs, Ra, Ca, Sr, Ba, and the like and combinations thereof, although these may be combined with insoluble inorganic compounds such as zeolites, as their phosphates may not be sufficiently insoluble. In still other embodiments, the radioactive cation is selected from members of the Actinide series, and in yet other embodiments, the radioactive cation is selected from members of the metals, transition metals, alkali metals, alkali earth metals, the Lanthanides, the Actinides, and combinations thereof. In some embodiments, the phosphate functional group includes one or more radioisotopes of phosphor, such as $^{32}P$ and $^{33}P$ (with $^{31}P$ being the stable isotope).

In operation, the particle suspension is formed by preparing the particle precursor solution of yttrium salt and sodium phosphate to define an admixture. The admixture is then mixed and heated to yield a plurality of $YPO_4$ particles by controlled precipitation. The resulting $YPO_4$ particles are rinsed (typically multiple times, more typically three times) with a sterile phosphate buffered saline (PBS) solution and removing or adding PBS to achieve the final desired volume. The pH of the final solution is adjusted, such as by the addition of sodium hydroxide or the like, and then any excess solution is removed or sterile PBS is added to achieve a final desired volume. The $YPO_4$ particles are then suspended in a phosphate buffered saline solution at neutral pH, suitable for injection in vivo into human or animal tissue.

The yttrium phosphate particles are radioactive so as to serve as distributed sources of therapeutic radiation for treating cancerous tumors and other diseases, such as by adding a predetermined amount of soluble radioactive $^{90}Y$ isotope to the particle precursor solution, that becomes homogeneously incorporated into the insoluble yttrium phosphate particle matrix, solubility of less than about $10^{-6}$ mole/liter, more typically less than $10^{-27}$ Ksp. The amount of radioactive yttrium (or like cation) is typically from about 100 uCi to 300 mCi; the specific amount needed varies for each patient application. Typically, the yttrium phosphate particle suspension has $YPO_4$ particle concentration in the range of 40 mg/ml to 125 mg/ml to facilitate imaging by x-ray computed tomography after being combined in a ratio of about 1 to 4 to 1 to 10 by volume with biocompatible hydrogel or other suitable liquid carrier solution for injection into human or animal tissue.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

We claim:

1. A radioactive yttrium phosphate suspension, comprising:
a phosphate buffered saline solution; and
a plurality of radioactive yttrium phosphate particles suspended in the phosphate buffered saline solution;
wherein the plurality of radioactive yttrium phosphate particles are between 0.03 um and 10 um in diameter;
wherein the plurality of radioactive yttrium phosphate particles are generally spherical; and
wherein the YPO4 particle concentration is in the range of 40 mg/ml to 125 mg/ml.

2. The radioactive yttrium phosphate suspension of claim 1 wherein the radioactive yttrium phosphate suspension is combined with a biocompatible hydrogel in a ratio of about 1:4 to 1:10 radioactive yttrium phosphate suspension to biocompatible hydrogel by volume.

3. The radioactive yttrium phosphate suspension of claim 1 wherein the radioactive yttrium phosphate suspension has a pH between 1.5 and 8.0.

4. The radioactive yttrium phosphate suspension of claim 1 wherein ninety percent of radioactive yttrium phosphate particles are between 0.1 um and 2 um in diameter.

5. The radioactive yttrium phosphate suspension of claim 1 wherein at least some of the yttrium phosphate includes a radioactive phosphorus isotope.

6. A radioactive phosphate suspension, comprising:
a phosphate buffered saline solution; and
a plurality of radioactive metal phosphate particles suspended in the phosphate buffered saline solution, wherein each metal phosphate particle includes a metal cation and a phosphate functional group; and
wherein the plurality of radioactive metal phosphate particles are between 0.03 um and 10 um in diameter.

7. The radioactive phosphate suspension of claim 6 wherein the plurality of radioactive metal phosphate particles are between 0.1 um and 2 um in diameter.

8. The radioactive phosphate suspension of claim 6 wherein the metal phosphate particles are selected from the group consisting of lanthanide phosphates, alkali earth phosphates, transition metal phosphates, and combinations thereof.

9. The radioactive phosphate suspension of claim 6 wherein the metal phosphate particles have solubility of less than $1 \times 10^{-6}$ moe/liter.

10. The radioactive phosphate suspension of claim 6 wherein the metal cations are selected from the group consisting of Y, Cu, Ho, Yb, Ce, Sm, Lu, Sc, Ca, Sr, Ba, and combinations thereof.

11. The radioactive phosphate suspension of claim 6 wherein the phosphate functional group includes phosphorus isotopes selected from the group consisting of 31P, 32P, 33P, and combinations thereof.

12. The radioactive phosphate suspension of claim 6 wherein the metal phosphate particle concentration is in the range of 40 mg/ml to 125 mg/ml.

13. The radioactive phosphate suspension of claim 12 wherein the metal phosphate particles provide a dosage of between 100 uCi and 300 mCi.

14. The radioactive phosphate suspension of claim 6 wherein the radioactive yttrium phosphate suspension is combined with a biocompatible hydrogel in a ratio of about 1:4 to 1:10 radioactive yttrium phosphate suspension to biocompatible hydrogel by volume.

15. The radioactive phosphate suspension of claim 6 wherein the metal cations are selected from the group consisting of Y, Cu, Ho, Yb, Ce, Sm, Sc, Ca, Sr, Ba, and combinations thereof; and wherein the phosphate functional group includes phosphor isotopes selected from the group consisting of 31P, 32P, 33P, and combinations thereof.

16. The radioactive phosphate suspension of claim 6 wherein the phosphate buffered saline solution has a stoichiometric excess of phosphate in the range of 5% to 100%.

17. A radioactive metal phosphate suspension, comprising:
    a phosphate buffered saline solution; and
        a plurality of radioactive metal phosphate particles suspended in the phosphate buffered saline solution, wherein each metal phosphate particle includes a metal cation and a phosphate functional group;
        wherein the plurality of radioactive metal phosphate particles are between 0.03 um and 10 um in diameter;
        wherein the metal phosphate particles are selected from the group consisting of lanthanide phosphates, actinide phosphates, alkali earth phosphates, transition metal phosphates, and combinations thereof;
        wherein the metal phosphate particles have solubility of less than $1 \times 10^{-6}$ mole/liter;
        wherein the phosphate functional group includes phosphorus isotopes selected from the group consisting of 31P, 32P, 33P, and combinations thereof; and
        wherein the metal phosphate particles provide a dosage of between 100 uCi and 300 mCi.

18. The radioactive metal phosphate suspension of claim 17 wherein the radioactive yttrium phosphate suspension is combined with a biocompatible hydrogel in a ratio of about 1:4 to 1:10 radioactive yttrium phosphate suspension to biocompatible hydrogel by volume.

\* \* \* \* \*